US008491129B2

United States Patent
Koyama

(10) Patent No.: US 8,491,129 B2
(45) Date of Patent: Jul. 23, 2013

(54) PROJECTOR HAVING STABILIZED ELEVATION FEET

(75) Inventor: Mika Koyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 13/049,326

(22) Filed: Mar. 16, 2011

(65) Prior Publication Data

US 2011/0235004 A1    Sep. 29, 2011

(30) Foreign Application Priority Data

Mar. 24, 2010 (JP) .................. 2010-067507

(51) Int. Cl.
*G03B 21/00* (2006.01)
*G03B 21/14* (2006.01)
*F16M 11/20* (2006.01)
*F16M 11/24* (2006.01)
*A47B 91/00* (2006.01)

(52) U.S. Cl.
USPC ............ 353/70; 353/69; 353/119; 248/188.2; 248/188.8

(58) Field of Classification Search
USPC ........ 353/69–70, 119; 248/188, 188.1–188.5, 248/188.8; 352/34, 242–243
See application file for complete search history.

(56) References Cited

U.S. PATENT DOCUMENTS

| | | | |
|---|---|---|---|
| 6,302,543 B1 * | 10/2001 | Arai et al. | 353/70 |
| 6,390,627 B1 * | 5/2002 | Kuroda | 353/119 |
| 6,793,348 B2 * | 9/2004 | Lee et al. | 353/119 |
| 7,535,721 B2 | 5/2009 | Okoshi et al. | |
| 7,566,043 B2 * | 7/2009 | Chen | 248/616 |
| 7,798,657 B2 * | 9/2010 | Liu | 353/101 |
| 7,901,091 B2 * | 3/2011 | Chen et al. | 353/119 |
| 2002/0140909 A1 * | 10/2002 | Tanaka | 353/70 |
| 2006/0113440 A1 * | 6/2006 | Chung et al. | 248/188.2 |
| 2007/0258055 A1 * | 11/2007 | Shao et al. | 353/70 |
| 2011/0297718 A1 * | 12/2011 | Klein | 224/575 |

FOREIGN PATENT DOCUMENTS

JP    2005-234307 A    9/2005

* cited by examiner

*Primary Examiner* — Tony Ko
*Assistant Examiner* — Jori S Reilly-Diakun

(57) ABSTRACT

A projector includes: an external housing which forms an external case, wherein a bottom surface of the external housing as a surface opposed to an installation surface on which the projector is installed has feet contacting the installation surface, the feet has a first foot freely projected toward the installation surface and withdrawn from the installation surface, and a second foot disposed away from the first foot and projected toward the installation surface, and the second foot is inclined in a direction away from the first foot in such a manner that the inclination of the second foot increases in the direction toward the installation surface.

7 Claims, 5 Drawing Sheets

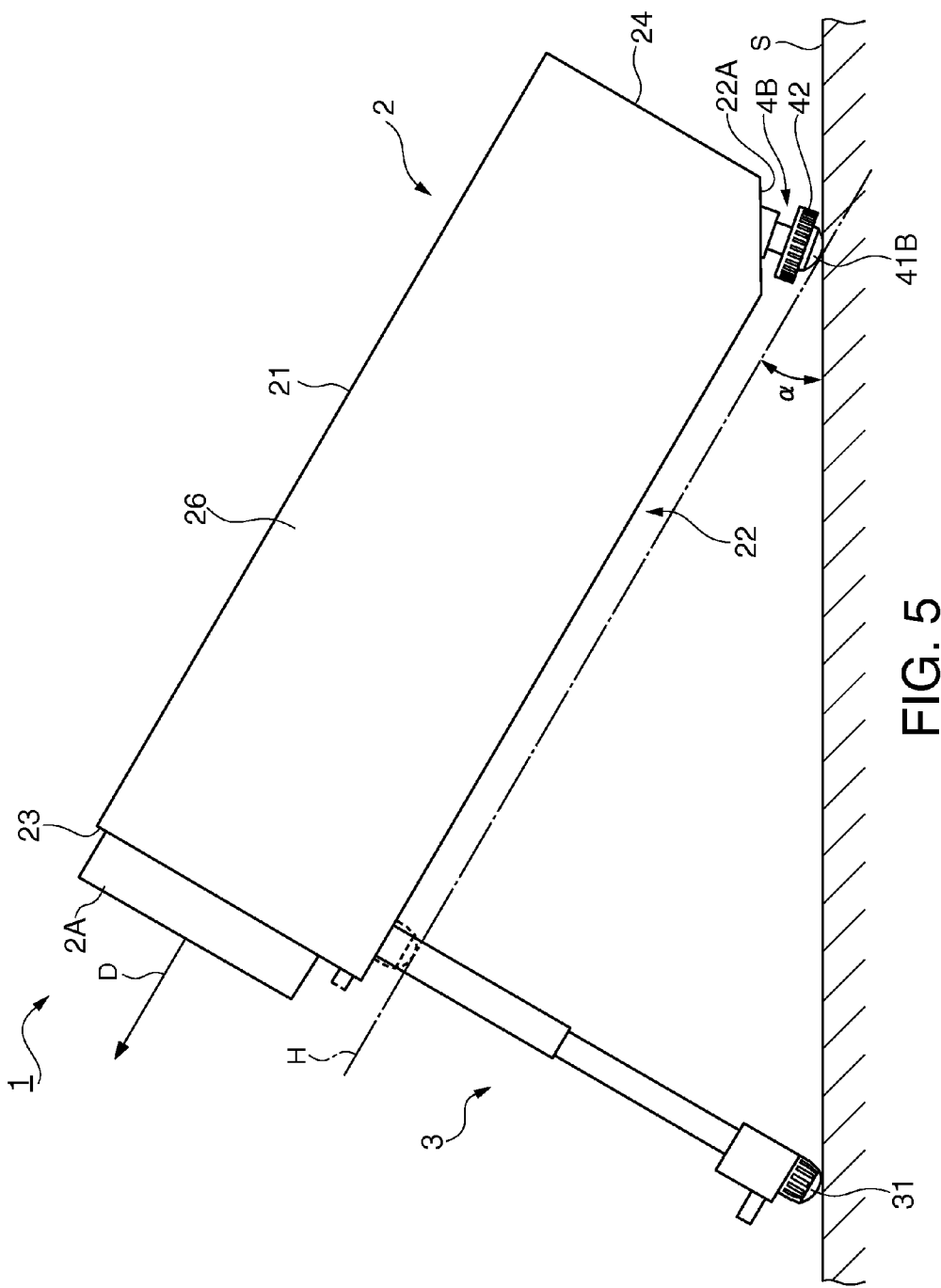

PROJECTOR HAVING STABILIZED ELEVATION FEET

CROSS-REFERENCE

The entire disclosure of Japanese Patent Application No. 2010-067507 filed Mar. 24, 2010, is expressly incorporated by reference herein.

BACKGROUND

1. Technical Field

The present invention relates to a projector.

2. Related Art

A projector which has feet (foot portions) provided on the bottom surface of its external housing as components brought into contact with an installation surface when the projector is placed on the installation surface such as a desk is known (for example, see JP-A-2005-234307).

The projector disclosed in JP-A-2005-234307 has structure capable of projecting an image from a projection lens in a direction diagonally upward with respect to the installation surface under an inclined position produced by raising the downstream end of the external housing (external case) of the projector in the image projection direction using a front foot (first position control mechanism) provided in the vicinity of the corresponding end. This structure allows the projector to project image light toward a screen disposed at a high position.

The projector according to JP-A-2005-234307 also has a rear foot (second position control mechanism) provided on the upstream side in the image projection direction and projected from the bottom surface of the external housing in the direction perpendicular to the bottom surface.

According to the projector disclosed in JP-A-2005-234307, however, the feet are greatly inclined with respect to the installation surface when the end of the external housing on the downstream side is raised to a high position for producing large inclination of the position of the projector. In this case, the position of the projector becomes unstable.

SUMMARY

An advantage of some aspects of the invention is to provide a projector capable of maintaining a stable position under an inclined position.

A projector according to an aspect of the invention includes an external housing which forms an external case. A bottom surface of the external housing as a surface opposed to an installation surface on which the projector is installed has feet contacting the installation surface. The feet has a first foot freely projected toward the installation surface and withdrawn from the installation surface, and a second foot disposed away from the first foot and projected toward the installation surface. The second foot is inclined in a direction away from the first foot in such a manner that the inclination of the second foot increases in the direction toward the installation surface.

According to this structure, the first foot is so constructed as to be freely projected toward the installation surface and withdrawn therefrom. In this case, the projector (external housing) becomes inclined to the installation surface when the first foot is projected. That is, the angle formed by the installation surface and the projector varies according to the projection and withdrawal of the first foot. The second foot is constructed such that the inclination of the second foot in the direction away from the first foot increases in the direction toward the installation surface. In this case, the inclination of the second foot to the installation surface becomes close to the right-angled inclination to the installation surface under the condition in which the projector is inclined with the first foot projected (inclined condition). Thus, the inclination of the second foot to the installation surface becomes small.

Accordingly, a stable position of the projector can be maintained even when the projector is largely inclined.

It is preferable that the angle formed by the vertical direction and the projection direction of the second foot when the first foot is withdrawn to the maximum is the half of the angle formed by the installation surface and the projector when the first foot is projected to the maximum or a smaller angle.

Generally, a projector is placed on an installation surface approximately under the condition in which the first foot is withdrawn to the maximum (flat condition) in many cases.

According to the structure of this aspect of the invention, the angle formed by the vertical direction and the projection direction of the second foot when the first foot is withdrawn to the maximum is set at the half of the angle formed by the projector and the installation surface when the first foot is projected to the maximum or a smaller angle. Thus, when the angle formed by the projection direction of the second foot and the vertical direction is set at the half of the angle formed by the installation surface and the projector under the maximum projection of the first foot, a well-balanced and stable position can be maintained both in the flat condition and the inclined condition. In case of an angle smaller than the half angle, a stable position can be maintained even under the inclined condition while giving great importance to maintenance of the stable position in the flat condition.

It is preferable that the bottom surface of the external housing has a notch at an end positioned in the direction from the first foot to the second foot.

When the distance between the external housing and the installation surface is short, there is a possibility that the corner of the bottom surface in the direction from the first foot to the second foot contacts the installation surface under the inclined condition of the projector with the first foot projected.

According to the structure of this aspect of the invention, however, the bottom surface of the external housing has the notch at the end positioned in the direction from the first foot to the second foot. In this case, the distance between this end of the external housing and the installation surface becomes long enough to prevent contact between this end and the installation surface when the external housing is inclined.

It is preferable that the second foot has a contact portion contacting the installation surface, and that the contact portion has a semispherical shape projecting toward the installation surface.

When the contact portion is constituted by a flat surface, a stable position of the projector can be maintained by surface contact between the contact portion and the installation surface in the flat condition. However, under the inclined condition, the contact area between the second foot and the installation surface becomes smaller than that area in the flat condition since only the corner (peripheral edge) of the contact portion contacts the installation surface. In this case, the stability lowers.

According to the structure of this aspect of the invention, however, the contact area between the contact portion and the installation surface is equalized between the positions in the flat condition and in the inclined condition due to the semispherical shape of the contact portion projecting toward the installation surface. Accordingly, a stable position can be similarly maintained either in the flat condition or in the inclined condition.

It is preferable that the second foot has a contact portion contacting the installation surface, and that the contact portion has elasticity.

According to this structure, the contact area between the second foot and the installation surface increases by deformation of the contact portion having elasticity. Thus, a stable position can be maintained.

BRIEF DESCRIPTION OF THE DRAWINGS

The invention will be described with reference to the accompanying drawings, wherein like numbers reference like elements.

FIG. 5 illustrates a position of the projector according to the embodiment.

DESCRIPTION OF EXEMPLARY EMBODIMENT

An exemplary embodiment according to the invention is hereinafter described with reference to the drawings.

Structure of Projector

Figure 1:
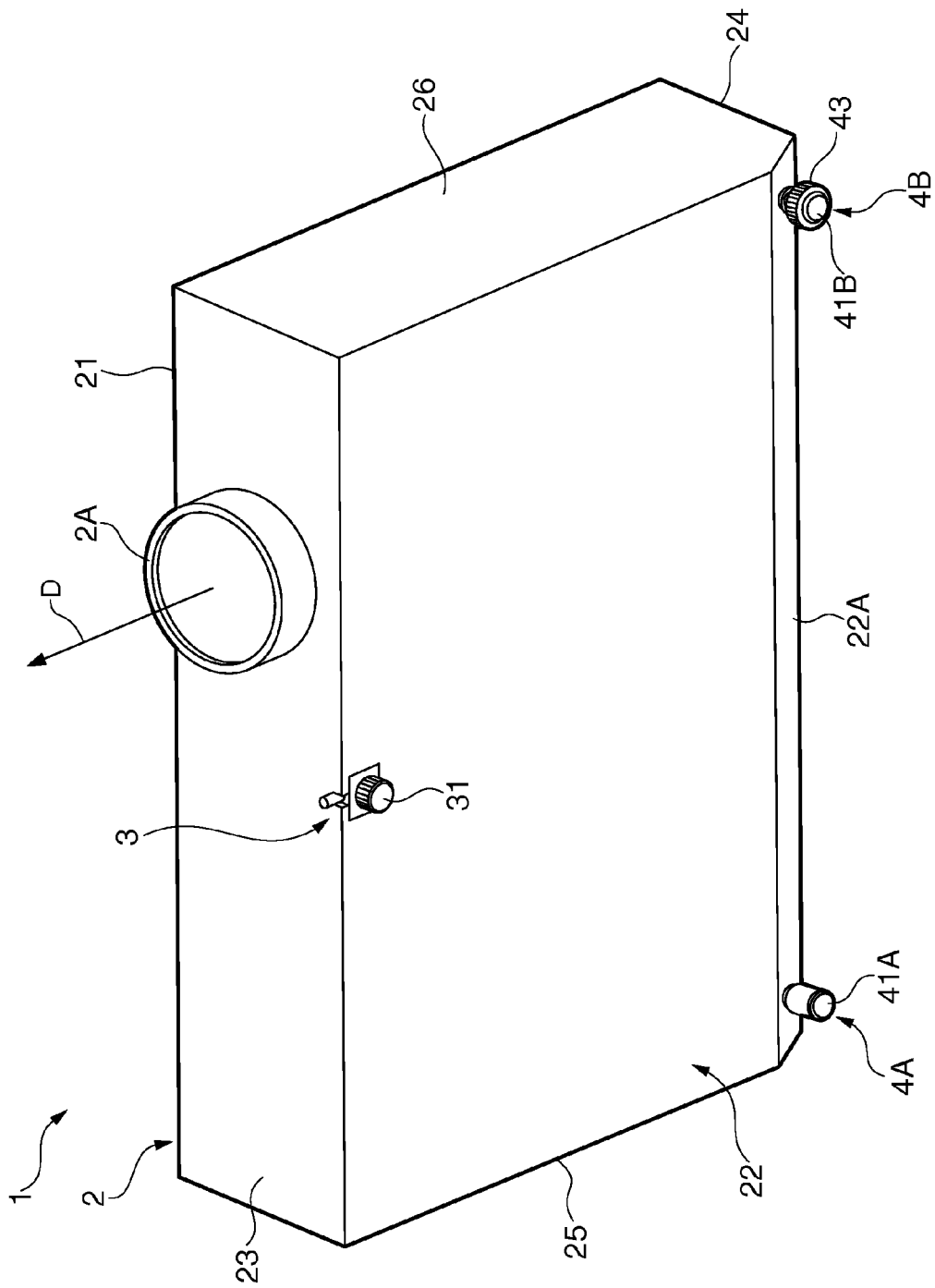
FIG. 1 is a perspective view illustrating the general appearance of a projector as viewed from below according to an embodiment of the invention.
Figure 2:
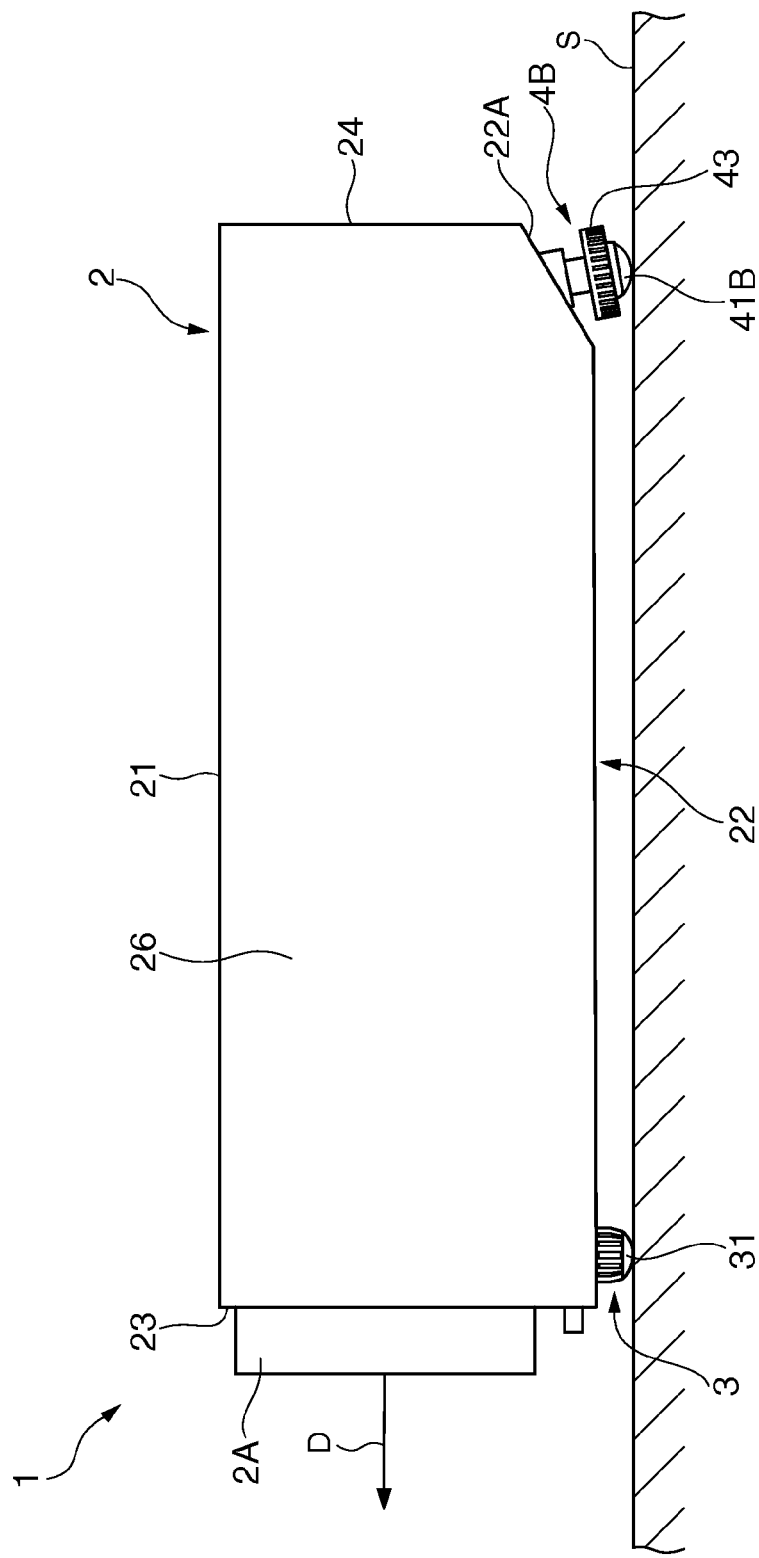
FIG. 2 is a side view of the projector according to the embodiment.
Figure 3:
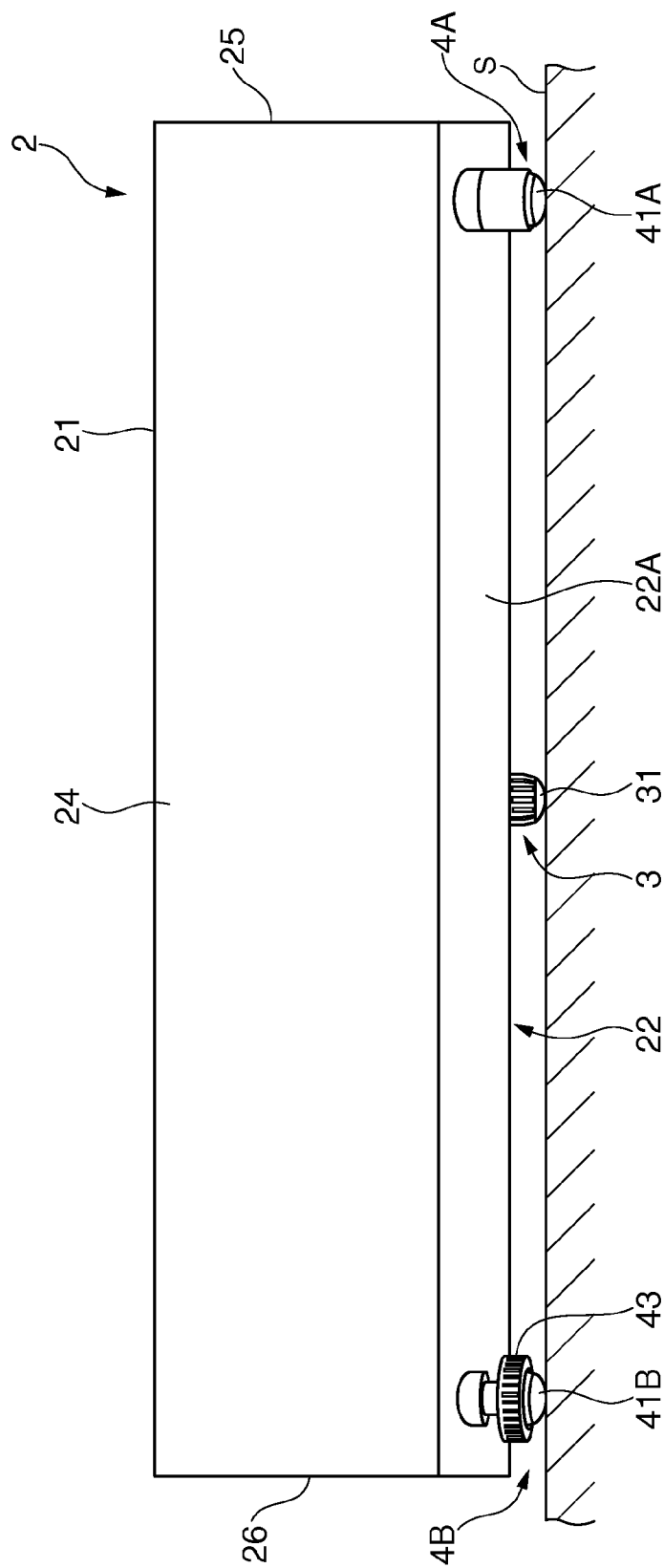
FIG. 3 is a rear view of the projector according to the embodiment.

FIG. 1 is a perspective view of a projector 1 in this embodiment as viewed from below. FIG. 2 is a side view of the projector 1 as viewed from the right. FIG. 3 is a rear view of the projector 1 as viewed from the back.

In this embodiment, the downstream side in the direction in which image light is projected from a projection lens 2A (projection direction D) corresponds to the front side, while the upstream side in this direction corresponds to the rear side. The "upper side" and the "lower side" described in this embodiment correspond to the upper side and the lower side as viewed in FIG. 1. The "left side" and the "right side" described in this embodiment correspond to the left side and the right side of the projector 1 as viewed from the front.

The projector 1 forms image light corresponding to image information (image signal) and projects the formed image light on a screen (not shown). As illustrated in FIG. 1, the projector 1 includes an external housing 2 constituting an external case. The external housing 2 has feet (a front foot 3 and rear feet 4A and 4B) which contact an installation surface S (FIGS. 2 and 3) as a horizontal surface such as a desk when the projector 1 is placed on the installation surface S.

Structure of External Housing

The external housing 2 accommodates an apparatus main body which includes a light source device, a light modulation device such as a liquid crystal panel for modulating light received from the light source device according to image information, and the projection lens 2A (FIG. 1) for projecting the light modulated by the light modulation device, and other units.

The apparatus main body as a component included in any of various types of projectors generally used is not specifically shown in the figure.

As illustrated in FIG. 1, the external housing 2 has a top surface 21 and a bottom surface 22 crossing the vertical direction, and a front surface 23, a rear surface 24, a left side surface 25, and a right side surface 26 extending along the vertical direction to form an approximately rectangular parallelepiped shape. The bottom surface 22 has a notch 22A at an end positioned in the direction from the front foot 3 to the rear feet 4A and 4B (on the rear side) as a notch extending in the left-right direction. Thus, the end of the bottom surface 22 on the rear side is inclined upward as illustrated in FIGS. 1 through 3.

Structure of Feet

As illustrated in FIGS. 1 through 3, the front foot 3 (corresponding to a first foot in the appended claims) is provided substantially at the center on the front part of the bottom surface 22. The front foot 3 is so constructed as to be freely projected from the outer surface of the bottom surface 22 as the surface of the external housing 2 opposed to the installation surface S toward the installation surface S, and withdrawn from the corresponding outer surface. This projection and withdrawal of the front foot 3 from the outer surface of the bottom surface 22 allow the projector 1 to be inclined to the installation surface S. Thus, the front foot 3 has structure capable of controlling its projection volume from the outer surface of the bottom surface 22.

As illustrated in FIG. 5, the inclination angle of the projector 1 is expressed by an angle $\alpha$ formed by the installation surface S and a plane H. The plane H is a virtual plane of the projector 1 as a plane connecting a contact portion 31 of the front foot 3 contacting the installation surface S and contact portions 41A and 41B (each corresponding to a contact portion in the appended claims) of the rear feet 4A and 4B under the position of the flat condition shown in FIG. 2. According to this embodiment, the plane H is a plane substantially parallel with the bottom surface 22. More specifically, the maximum inclination angle of the projector 1 produced by the front foot 3 is set at 30°. The maximum inclination angle 30° is the maximum of the angle $\alpha$ which corresponds to the angle formed by the installation surface S and the bottom surface 22 of the external housing 2 of the projector 1 when the front foot 3 is projected to the maximum.

As illustrated in FIGS. 1 through 3, the rear feet 4A and 4B (each corresponding to a second foot in the appended claims) are provided at the left and right ends of the notch 22A, that is, at the rear corners of the bottom surface 22. Thus, the rear feet 4A and 4B are disposed on the rear side away from the front foot 3.

The rear foot 4A projects from the left end of the notch 22A. The rear foot 4A is a fixed foot projecting downward from the outer surface of the bottom surface 22 by a predetermined amount of projection toward the installation surface S.

The rear foot 4B projects from the right end of the notch 22A. The rear foot 4B is a movable foot having a function of controlling the inclination of the projector 1 in the left-right direction, and projects downward from the outer surface of the bottom surface 22 by a predetermined amount of projection toward the installation surface S.

Figure 4:
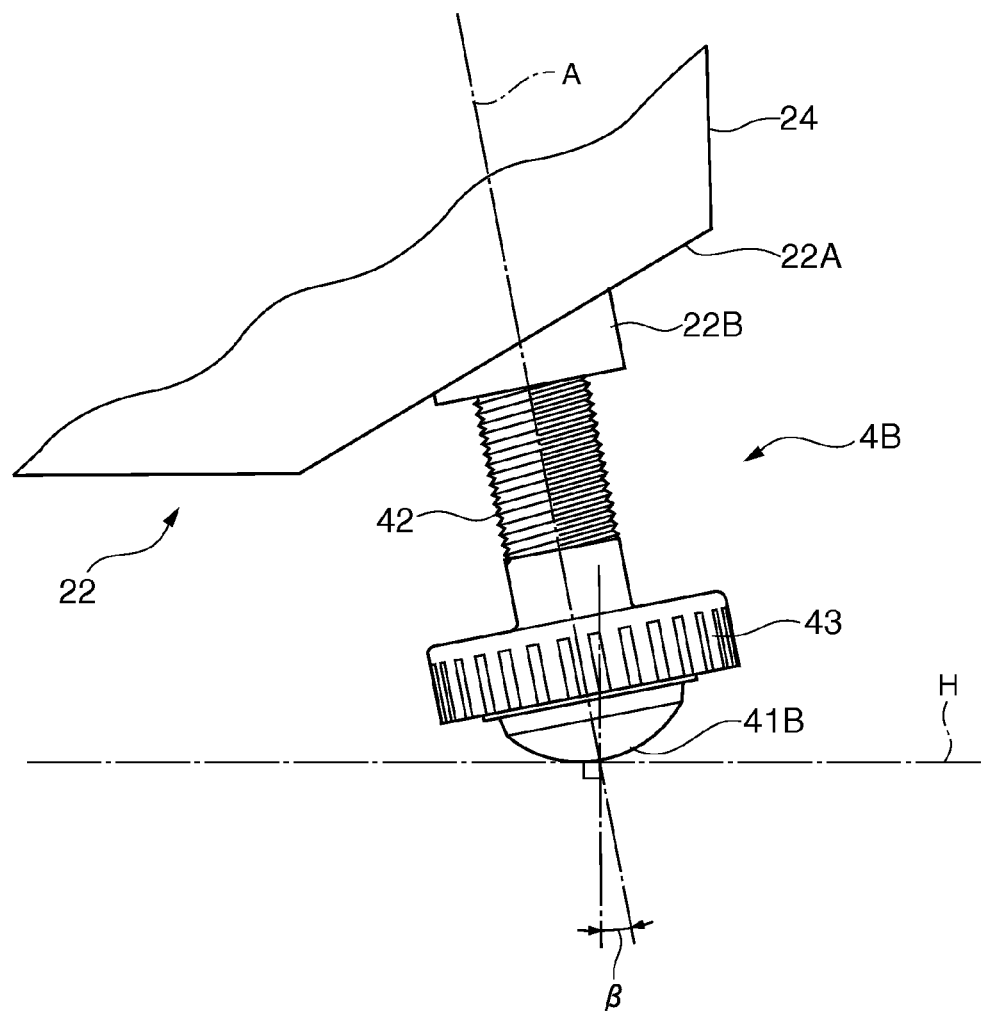
FIG. 4 is an enlarged view of a rear foot according to the embodiment.

FIG. 4 is an enlarged view of the rear foot 4B. More specifically, FIG. 4 is a side view of the enlarged rear foot 4B shown in FIG. 2.

As illustrated in FIG. 4, the rear foot 4B has a cylindrical shaft portion 42 on the surface of which a screw thread is formed.

The screw thread engages with a screw groove (not shown) formed on the inner surface of a cylindrical screw portion 22B provided on the bottom surface 22. According to this structure, the rear foot 4B is freely rotatable around an axis A with respect to the external housing 2 by using the screw mechanism, based on which rotation the projector 1 controls the projection level from the outer surface of the bottom surface 22.

An operation handle 43 is provided close to the tip of the shaft portion 42.

The operation handle 43 is a component operated by a user when the rear foot 4B is rotated. The operation handle 43 is disposed near the tip of the shaft portion 43, and has a larger diameter than the diameter of the shaft portion 42 so that the user can easily rotate the rear foot 4B.

As illustrated in FIG. 4, the rear foot 4B is provided in such a condition that the inclination of the rear foot 4B toward the rear increases in the direction toward the plane H so as to stabilize the position in the inclined condition. That is, the inclination of the rear foot 4B in the direction away from the front foot 3 increases in the direction toward the installation surface S. Similarly, as illustrated in FIGS. 1 through 3, the rear foot 4A is inclined toward the rear with respect to the plane H in a manner similar to that of the rear foot 4B. That is, the inclination of each of the rear feet 4A and 4B toward the rear increases in the downward direction. Thus, while the front foot 3 projects in the direction perpendicular to the plane H, each of the rear feet 4A and 4B is inclined toward the rear by an inclination angle β with respect to the direction perpendicular to the plane H under the flat condition. More specifically, the angle β is set at the half of the maximum inclination angle of the projector 1 or smaller (the angle β lies in the range from 10° to 15° when the maximum inclination angle is 30°, for example), considering the stability of the position under the flat condition. Therefore, the angle β corresponds to an angle formed by the projection directions of the rear feet 4A and 4B and the vertical direction when the front foot 3 is withdrawn to the maximum, and is set at the half of the maximum of the angle α or smaller.

As explained above, the front foot 3 and the rear feet 4A and 4B have the contact portion 31 and the contact portions 41A and 41B each of which contacts the installation surface S. As illustrated in FIGS. 1 through 4, each of the contact portion 31 and the contact portions 41A and 41B has a semispherical shape projecting toward the installation surface S, and is made of elastic material such as rubber.

FIG. 5 illustrates a position of the projector 1. More specifically, FIG. 5 is a side view of the projector 1 under the condition in which the position of the projector 1 is inclined to the maximum.

In the following description, the change from the flat condition shown in FIG. 2 to the inclined condition shown in FIG. 4 is discussed as an example.

Under the flat condition shown in FIG. 2, the plane H agrees with the installation surface S. In this case, the rear feet 4A and 4B are inclined toward the rear by the angle β with respect to the direction perpendicular to the installation surface S. As explained above, the angle β is set at the half of the maximum inclination angle of the projector 1 or smaller. Thus, the inclination of the rear feet 4A and 4B with respect to the installation surface S in the flat condition is small. That is, the inclination of the rear feet 4A and 4B with respect to the installation surface S is close to the right-angled inclination to the installation surface S.

When the front foot 3 under the condition shown in FIG. 2 is pulled out by the user, the front side of the external housing 2 is raised in such a condition that inclination of the position of the projector 1 is produced. As a result, the projector 1 comes into the inclined condition.

As explained above, the rear feet 4A and 4B have inclination toward the rear. Thus, under the inclined condition of the projector 1, the inclination of each of the rear feet 4A and 4B comes close to the right-angled inclination to the installation surface S by this inclination level.

The contact portions 41A and 41B of the rear feet 4A and 4B as elastic portions are deformed by the weight of the projector 1 either in the flat condition or in the inclined condition. Thus, the contact areas between the rear feet 4A and 4B and the installation surface S increase either in the flat condition or in the inclined condition.

According to the projector in this embodiment described herein, the following advantages can be offered.

The front foot 3 is constructed in such a manner as to be freely projected toward the installation surface S and withdrawn therefrom. When the front foot 3 is projected, the external housing 2, i.e., the plane H is inclined to the installation surface S. That is, the angle α formed by the installation surface S and the plane H varies according to the projection and withdrawal of the front foot 3. The rear feet 4A and 4B are so structured that the inclination of the rear feet 4A and 4B in the direction away from the front foot 3 increases in the direction toward the installation surface S. In this case, the inclination of the rear feet 4A and 4B to the installation surface S becomes close to the right-angled inclination to the installation surface S even in the inclined condition. Thus, the inclination of the rear feet 4A and 4B to the installation surface S decreases.

Accordingly, a stable position of the projector 1 can be maintained even when the projector 1 is largely inclined.

The angle β is set at the half of the maximum of the angle α or smaller. When the angle β is set at the half angle of the maximum angle α, a well-balanced and stable position can be maintained both in the flat condition and in the inclined condition. When the angle β is an angle smaller than the half of the maximum angle α, a stable position can be maintained even under the inclined condition in accordance with the angle β while giving great importance to maintenance of the stable position in the flat condition as a more frequent condition for installation on the installation surface S.

The bottom surface 22 of the external housing 2 has the notch 22A at the end on the rear side. In this case, the distance between this end of the external housing 2 and the installation surface S becomes long enough to prevent contact between this end and the installation surface S when the external housing 2 is inclined.

Each of the contact portion 31 and the contact portions 41A and 41B has elasticity and a semispherical shape which projects toward the installation surface S. In this case, the contact areas between the installation surface S and the respective contact portions 31, 41A and 41B can be equalized between the positions in the flat condition and in the inclined condition. Moreover, the contact areas between the installation surface S and the front foot 3 and the rear feet 4A and 4B increase by deformation of the contact portion 31A and the contact portions 41A and 41B as elastic components. Accordingly, a stable position can be similarly maintained either in the flat condition or the inclined condition.

Modifications of Embodiment

The invention is not limited to the embodiment described herein but may be practiced otherwise without departing from the scope of the invention. Therefore, modifications, improvements and the like including the following changes may be made.

According to this embodiment, the one front foot 3 and the two rear feet 4A and 4B are placed on the installation surface S. However, two front feet and one rear foot may be provided, for example. Thus, the numbers of the front foot and the rear foot may be arbitrarily determined.

According to this embodiment, the bottom surface 22 has the notch 22A. However, the bottom surface 22 is not required to have the notch 22A. When the notch 22A is not provided, contact between the external housing 2 and the installation surface S under the inclined condition can be avoided by disposing the rear feet 4A and 4B in the vicinity of the end of the bottom surface 2 on the rear side.

According to this embodiment, the rear feet 4A and 4B project from the area of the bottom surface 22 where the notch 22A is provided. However, the rear feet 4A and 4B may project toward the installation surface S from an area of the bottom surface 22 where the notch 22A is not formed.

What is claimed is:

1. A projector comprising:
   an external housing which forms an external case,
   a bottom surface opposing an installation surface on which the projector is supported during use, and
   feet extending from the bottom surface and configured to contact the installation surface,
   wherein
   the feet has a first foot that is freely projectable from a fully withdrawn position to a fully extended position, and a second foot disposed away from the first foot and projected toward the installation surface,
   the second foot is inclined with respect to the bottom surface such that an angle formed by a projection direction of the second foot and the installation surface is offset from the perpendicular with respect to the installation surface when the first foot is in the fully withdrawn position, and
   as the first, foot projected to incline the projector, the angle of inclination of the second foot approaches being perpendicular to the installation surface and is substantially perpendicular when the first foot is in the fully extended position.

2. The projector according to claim 1, wherein, when the first foot is projected to the fully extended position, the angle formed by the vertical direction to the installation surface and the projection direction of the second foot is no more than half of the angle formed by the installation surface and the bottom surface.

3. The projector according to claim 1, wherein the bottom surface of the external housing has a notch at an end positioned in the direction from the first foot to the second foot.

4. The projector according to claim 2, wherein the bottom surface of the external housing has a notch at an end positioned in the direction from the first foot to the second foot.

5. The projector according to claim 1, wherein
   the second foot has a contact portion contacting the installation surface; and
   the contact portion has a semispherical shape projecting toward the installation surface.

6. The projector according to claim 5, wherein the contact portion has elasticity.

7. The projector according to claim 1, wherein
   the feet include two second feet;
   one of the second feet is a fixed foot; and
   the other of the second feet is a movable foot having a function of controlling inclination of the projector in the left-right direction.

* * * * *